Patented May 13, 1941

2,241,511

UNITED STATES PATENT OFFICE 2,241,511

METHOD OF TREATING THE SURFACE OF GLASS BODIES

Joseph F. Greene, Vineland, N. J., assignor to Kimble Glass Company, Vineland, N. J., a corporation of Illinois No Drawing. Application September 29, 1938, Serial No. 232,462

5 Claims. (Cl. 49—77)

The present invention relates to the surface treatment of glass bodies, and more particularly to the annealing thereof in an atmosphere containing acid gases.

It has been found that in glass annealed in an atmosphere containing acid gases the surface durability is higher than that of glassware annealed in an atmosphere free from such gases.

It has previously been proposed to introduce into an annealing lehr sulphur in the form of powder or pellets to create therein an atmosphere containing sulphur dioxide or sulphur trioxide, these acid gases being intended to react with alkalis in the glass.

In some types of containers, such as bottles, sulphur pellets have been deposited in the bottles during the annealing operation to create an acid atmosphere in the annealing lehr. There are, however, some types of containers having small openings through which it is impracticable to insert pellets or even powder. It is therefore, desirable that the atmosphere be created by some means other than by powder or pellets. It is also desirable that the acid atmosphere be controllable within definite limits for any operating condition of the annealing lehr. It is also important that the acid gas be introduced into the lehr in such a manner and at such locations in the lehr that a proper circulation of the acid gases therein is obtained.

It is one of the objects of the present invention to treat the surface of glass bodies in an acid atmosphere by introducing the acid forming material with the products of combustion of fuel such as is used in oil-fired annealing lehrs.

It is also an object of the invention to mix with the fuel oil predetermined amounts of the acid forming material so that the character of the acid atmosphere will be known in advance and can be easily controlled.

One manner of carrying out the method of the invention is to incorporate acid forming materials containing elements or compounds of elements, such as those of the halogen group, sulphur, nitrogen and phosphorus, and similar acid gas forming materials in the fuel employed to heat the annealing lehr. This may be done by mixing the material with the fuel oil. Powdered sulphur can be mixed with the oil and if desired can be kept in suspension by agitation or by passing the mixture through a colloid mill. Sulphur may be added to the fuel oil by first mixing it with a dispersing agent and then adding the sulphur so dispersed in the agent to the fuel oil. Another method of adding sulphur to the fuel oil is to mix it with an emulsifying agent prior to its incorporation into the fuel oil.

There are also certain solvents for sulphur which may be employed as a carrier for the sulphur prior to its addition to the fuel oil. Carbon disulphide, for instance, is a suitable material which may be readily mixed with the oil.

Also, there are any number of compounds containing sulphur which are easily incorporated into the oil and readily introduced into the lehr with the products of combustion of the ignited fuel.

As in the case with sulphur, other materials for forming acid gases may be mixed with the oil used for heating the lehr either by direct mixing or by dissolving the same in a suitable solvent or by combining the material with a dispersing or emulsifying agent.

The acid gas forming material need not be mixed with the fuel oil prior to discharge of the oil from a flame nozzle. It may, for instance, be discharged from a separate nozzle adjacent to or concentric with the oil nozzle so that it is intimately mixed with the atomized oil just prior to or as the latter is ignited.

The material may be in the form of a gas, a liquid, or a solid, it being only necessary that it be in such form that it is readily mixed with the fuel oil and the quantity mixed therewith be controllable.

In heating the lehr, the fuel oil is, of course, forced under pressure through a nozzle into the furnace and ignited, the products of combustion being introduced into the lehr through suitable openings, ducts, or similar conduits, and these may be so positioned in the walls or roof of the lehr to obtain such circulation of the heated gases that they will be brought into contact with glassware throughout the lehr. Since the quantity of acid gas forming material required to produce an atmosphere of predetermined characteristics may be readily determined in advance, it is apparent that the character of the heated atmosphere within the lehr may be definitely controlled.

While several examples of acid gas forming materials have been referred to herein, the invention is not limited to those materials given as specific examples. However, in view of the adaptability of sulphur for this purpose, it is preferred that this material be used. The invention, however, is capable of modification and its limits are to be determined only by the scope of the appended claims.

What I claim as my invention is:

1. The method of treating the surface of glass bodies which consists in positioning the bodies in an annealing lehr, mixing with a fuel oil a material capable of forming an acid gas, thereafter igniting the fuel oil having the acid gas forming material mixed therewith, and introducing the resulting products of combustion into the lehr.

2. The method of treating the surface of glass bodies which consists in positioning the bodies in an annealing lehr, mixing sulphur with a fuel oil, thereafter igniting the fuel oil having sulphur mixed therewith, and introducing the resulting products of combustion into the lehr.

3. The method of treating the surface of glass bodies which consists in positioning the bodies in an annealing lehr, mixing a compound containing sulphur with a fuel oil, thereafter igniting the fuel oil having the sulphur compound mixed therewith, and introducing the resulting products of combustion into the lehr.

4. The method of treating the surface of glass bodies which consists in positioning the bodies in an annealing lehr, mixing with a dispersing agent a material capable of forming an acid gas, adding the agent and acid gas material dispersed therein to a fuel oil, thereafter igniting the fuel oil to which the dispersed acid gas forming material has been added, and introducing the resulting products of combustion into the lehr.

5. The method of treating the surface of glass bodies which consists in positioning the bodies in an annealing lehr, discharging a fuel oil under pressure into the lehr, simultaneously introducing a material capable of forming an acid gas into the lehr with the fuel oil so that the fuel oil acts as a carrier for the acid gas forming material, and igniting the fuel oil as it enters the lehr.

JOSEPH F. GREENE.